United States Patent [19]

Cuneo et al.

[11] Patent Number: 4,695,474

[45] Date of Patent: Sep. 22, 1987

[54] DRY, SUGAR-FREE INSTANT PUDDING MIX

[75] Inventors: Carol A. Cuneo, South Plainfield, N.J.; Charles Lambert, Decatur, Ill.

[73] Assignee: General Foods Corporation, White Plains, N.Y.

[21] Appl. No.: 784,438

[22] Filed: Oct. 3, 1985

[51] Int. Cl.$^4$ ............................................. A23L 1/187
[52] U.S. Cl. .................................... 426/579; 426/804
[58] Field of Search ....................... 426/578, 575, 804

[56] References Cited

U.S. PATENT DOCUMENTS

| | | | |
|---|---|---|---|
| 4,006,262 | 2/1977 | Smith et al. | 426/573 |
| 4,361,592 | 11/1982 | Carpenter et al. | 426/579 |
| 4,438,148 | 3/1984 | O'Rourke et al. | 426/579 |
| 4,469,712 | 9/1984 | Katcher et al. | 426/579 |

OTHER PUBLICATIONS

National Starch and Chemical Corp., Bulletin No. 457, N-Zorbit (undated).

*Primary Examiner*—Jeanette Hunter
*Attorney, Agent, or Firm*—Thomas R. Savoie; Barbara T. D'Avanzo; Daniel J. Donovan

[57] ABSTRACT

A dry, sugar-free instant pudding mix containing at least 45% by weight of pregelatinized starch said starch having a preferable particle size wherein in excess of 95% by weight of particles are between 230 and 80 U.S. mesh. The mix contains from 15 to 30% of an expanded hydrolyzed starch material and other suitable functional ingredients.

6 Claims, No Drawings

DRY, SUGAR-FREE INSTANT PUDDING MIX

BACKGROUND OF THE INVENTION

The trend in recent years has been towards convenience in food preparations and towards reduced-calorie and/or sugar-free foods. In line with these trends sugar-free instant puddings are desirable. As known in the art instant puddings are prepared without cooking by simply mixing a dry powder with milk. While sugar-containing instant puddings have met with consumer acceptance both in terms of ease of preparation and organoleptic quality, attempts at formulating sugar-free instant pudding mixes present problems related to poor dispersibility of the dry mix in milk.

Current sugar-containing, instant pudding mixes, such as described in commonly-assigned U.S. Pat. No. 4,469,712, contain in excess of 70% by weight of sugar and less than about 20% by weight of pre-gelatinized starch. These mixes do not encounter significant dispersion problems since the sugar particles will effectively separate the starch particles and upon mixing with milk each starch particle will swell independently and uniformly rather than sticking together. This patent further teaches that the use of powdered sugar and relatively fine-grind (greater than 50%, minus 400 U.S. mesh), pre-gelatinized starch particles will improve the texture and gloss of the prepared pudding.

Commonly-assigned U.S. Pat. No. 4,361,592 also relates to improving the texture and appearance of instant pudding also using a combination of fine-grind (greater than 50%, minus 400 U.S. mesh), pregelatinized starch and pwdered sugar.

The prior art does not, however, disclose the formulation of dry, sugar-free instant pudding mixes which are readily dispersible in cold milk and which produce a pudding having commercially-acceptable texture (i.e. an absence of lumps).

DESCRIPTION OF THE INVENTION

A sugar-free instant pudding mix having dispersibility comparable to sugar-containing instant pudding mixes is prepared utilizing in combination from 15 to 30% of an expanded, hydrolyzed starch material and at least 45% of a water-soluble, pregelatinized starch material having a defined granulation.

Unless otherwise noted, all particle size fractions recited herein are weight fractions, all mesh sizes are U.S. Standard Sieve sizes and all percents are weight percents.

According to the present invention a low bulk density, hydrolyzed starch material, such as a dextrin or maltodextrin, having a bulk density (tapped) less than 0.2 g/cc is combined with a pregelatinized starch material which has a relatively-coarse particle size distribution wherein at least 55% is retained on a 230 mesh screen (63 microns) and a maximum of 2% is retained on an 80 mesh screen (177 microns). Preferably the granulation of the starch is such that at least 80% is retained on a 230 mesh screen and a maximum of 1% is retained on an 80 mesh screen. Most preferably in excess of 95% of the starch particles are between 230 and 80 mesh. These components are further combined with an intensive sweetener, such as aspartame and suitable flavoring, coloring, texture and gelling agents to formulate a sugar-free instant pudding mix.

The hydrolyzed starch material will have a particle size wherein preferably all of the particles will be less than 40 mesh (420 microns) and in excess of 80% of the particles will be retained on a 270 mesh screen (53 microns). Most preferably the particle size will be such that at least 95% of the particles are retained or a 325 mesh screen (44 microns). The bulk density of this material is preferably below 0.1 g/cc. Typically this material is derived from tapioca and/or corn starch and is processed to be free of any off-flavors. A suitable material is a spray-dried tapioca dextrin available from National Starch and Chemical Corporation (Bridgewater, N.J.) under the name of N-Zorbit ®.

The pregelatinized starch employed in the dry instant pudding mix is of a type that is common in the pudding mix art. This can include chemically as well as physically modified pregelatinized starches from sources such as corn, waxy maize, tapioca, wheat, potato, etc. Nonetheless, it is more preferred that the starch be tapioco. It is also preferred that if the starch is chemically modified, that the chemical modification be either a hydroxypropylation, a crosslinking or a combination thereof.

The preferred pregelatinized starch material for use in the present invention may be a spray-dried pregelatinized starch prepared by the process set forth in commonly-assigned U.S. Pat. No. 4,280,851 to Pitchon et al., which patent is hereby incorporated by reference.

The controlled particle size of the starch in combination with the expanded hydrolyzed starch material provide unexpected textural and appearance benefits as compared to either regular or fine grind starch. A regular starch would generally have a particle size wherein less than 50% by weight of the starch particles pass through a 400 mesh screen (37 microns), and no more than about 50% of the starch are retained on a 230 mesh screen (63 microns).

The pudding mix of this invention contains levels of the various ingredients as will be readily determined by those skilled in the art, for example: setting agents at 5–15% (preferably 6–12%); flavor at 1 to 10%; and optionally cocoa at 10 to 25%. The setting agents are preferably an alkali pyrophosphate and an alkali orthophosphate. The mix will also contain an intensive sweetening agent such as aspartame, saccharin, cyclamate or the like in amounts about 0.1 to 3% and effective to provide a desirable sweet taste to the prepared pudding. Other functional ingredients such as 0.2–2% bodying agents (e.g. microcrystalline cellulose, carboxymethylcellulose, natural gums, and the like), colors, 0.2–2% clouding agents, flavor enhancers may be included in the dry pudding mix in amounts which may be readily determined by those skilled in the art.

The instant pudding mix is prepared by mixing the pudding mix with milk and allowing the mixture to set. For example, about 40 grams of mix is mixed with 2 cups (473 ml) of milk. The mix rapidly and uniformly disperses and hydrates resulting in a pudding which possesses a creamy, smooth texture and a caloric count of less than 100 calories per one-half cup serving (using 2% fat milk).

The following examples are included in order to further describe but not limit the invention.

EXAMPLE 1

A sugar-free, chocolate-flavored instant pudding mix was prepared by dry blending the listed ingredients.

| Ingredient | Approx. Weight % |
| --- | --- |
| Pregelatinized Tapioca Starch | 48.5 |
| (96%, +230 mesh; 1%, +80 mesh) | |
| Tapioca Dextrin (N-Zorbit ®) | 19.6 |
| (0.08 g/cc; 100%, −40 mesh; | |
| 98%, +325 mesh) | |
| Cocoa Powder | 16.4 |
| Disodium Orthophosphate | 3.5 |
| Tetrasodium Pyrophosphate | 3.5 |
| Flavor and Colors (including carriers) | 5.5 |
| Aspartame | 1.2 |
| Microcrystalline Cellulose | 0.6 |
| Titanium Dioxide Clouding Agent | 0.5 |

43.3 grams of the mix was added to two cups of cold milk (2% fat) and mixed with an electric mixer (lowest speed) for two minutes. The mix was completely dispersed and was free of starch lumps. The pudding was poured into dessert dishes and was ready to eat in five minutes. A four fluid ounce (120 ml) serving of this pudding contained less than 100 calories.

EXAMPLE 2

A sugar-free, vanilla-flavored instant pudding mix was prepared by dry-blending the listed ingredients.

| Ingredient | Approx. Weight % |
| --- | --- |
| Pregelatinized Tapioca Starch | 56.1 |
| (per Example 1) | |
| Tapioca Dextrin | 25.1 |
| (per Example 1) | |
| Tetrasodium Pyrophosphate | 5.2 |
| Disodium Orthophosphate | 4.4 |
| Flavors and Colors (including carriers) | 6.0 |
| Aspartame | 1.3 |
| Titanium Dioxide Clouding Agent | 1.2 |
| Microcrystalline Cellulose | 0.7 |

The dry mix performed as in Example 1. The pudding contained less than 90 calories per serving.

Having thus disclosed the invention what is claimed is:

1. A dry, sugar-free instant pudding mix which rapidly and uniformly disperses and hydrates when mixed with cold milk comprising:
   (a) at least 45% by weight of pregelatinized corn, waxy maize or tapioca starch material having a particle size distribution wherein at least 55% by weight of the material is retained on a 230 U.S. mesh screen and no more than 2% by weight of the material is retained on an 80 U.S. mesh screen;
   (b) from 15 to 30% of an expanded hydrolyzed starch product having a bulk density of less than 0.2 g/cc and a particle size wherein in excess of 80% by weight will be retained on a 270 U.S. mesh screen and
   (c) an intensive sweetening agent in an amount effective to impart a sweet taste to the prepared pudding.

2. The pudding mix of claim 1 wherein at least 80% by weight of the pregelatinized starch material is retained on a 230 U.S. mesh screen and no more than 1% by weight of this material is retained on an 80 U.S. mesh screen.

3. The pudding mix of claim 2 wherein the expanded starch powder has a bulk density of less than 0.1 g/cc.

4. The pudding mix of claim 3 wherein in excess of 95% by weight of the pregelatinized starch material is between 230 U.S. mesh and 80 U.S. mesh.

5. The pudding mix of claim 1 wherein, when prepared with 2% fat milk, produces a pudding having 30 less than 100 calories per four fluid ounce serving.

6. The pudding mix of claim 1 wherein the starch material is tapioca starch.

* * * * *